H. H. CARTER.
MOTOR FIRE ENGINE AND RAIL COACH OR TRUCK.
APPLICATION FILED MAY 11, 1920.
1,405,278.
Patented Jan. 31, 1922.
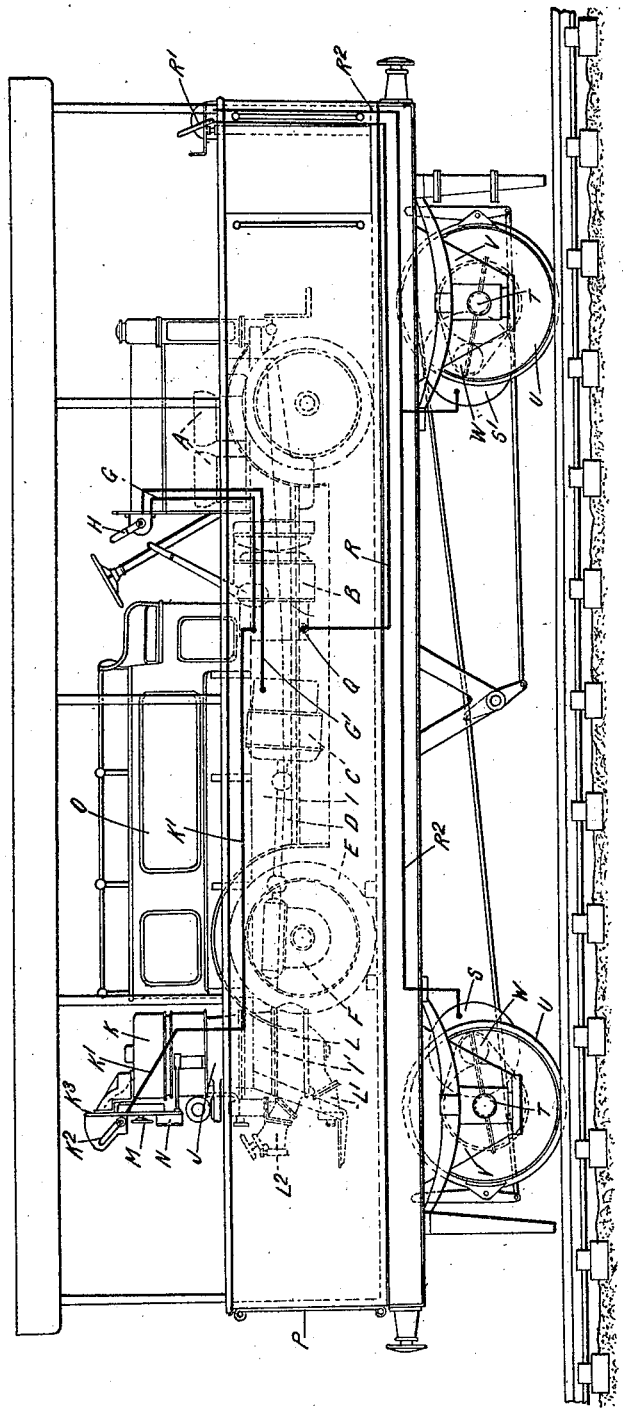
INVENTOR
Harold Herbert Carter
By Niilaus Niilaus
Attorneys

UNITED STATES PATENT OFFICE.

HAROLD HERBERT CARTER, OF THORNTON HEATH, ENGLAND.

MOTOR FIRE ENGINE AND RAIL COACH OR TRUCK.

1,405,278.  Specification of Letters Patent.  Patented Jan. 31, 1922.

Application filed May 11, 1920. Serial No. 380,710.

*To all whom it may concern:*

Be it known that I, HAROLD HERBERT CARTER, a subject of the King of Great Britain, residing at 12 Nutfield Gardens, Thornton Heath, Surrey, England, have invented new and useful Improvements in and relating to Motor Fire Engines and Rail Coaches or Trucks, of which the following is the specification.

This invention relates to improvements in motor fire engines and rail coaches or trucks.

The object of this invention is to provide a construction and arrangement of rail coach or truck which may be electrically propelled and which coach may be used in combination with a road motor fire engine having a source of electrical energy thereon, the combination being adapted to serve as an emergency fire engine to run upon rails.

We provide one or both of the axles of the railway coach or truck with an electric motor, the shaft of which is preferably parallel with and adjacent to the axle. Means are provided such as toothed gear or chain wheels for suitably connecting the shaft of the electric motor to the adjacent axle in order to drive same. The leads or wires for energizing the said electric motor, or motors, if two are employed, are passed through the floor of the coach or truck in a suitably insulated or protected manner.

The said coach or truck is made to suitably open at one end in order that the motor fire engine preferably of the petrol electric type may be run on to the said railway coach or truck and suitably scotched or held thereon by removable bars or the like.

When the petrol electric fire engine is run into position and secured upon the said coach, the leads or wires before mentioned connected to the said electric motor or motors are then connected to the dynamo or generator upon the said road petrol electric fire engine, and by switching means provided thereon the propelling electric motor upon the said fire engine is completely isolated in order that the whole of the energy provided by the internal combustion engine and dynamo and the said road fire engine may be conveyed or transmitted through suitable controlling switches to the electric motor or motors for driving the said railway coach or truck.

The combined vehicle as described may then be run along the rails to the position in which it is desired to operate on the fire.

The leads or wires connecting to the electric motor or motors driving the said coach are then detached or disconnected from the said dynamo, and the leads or wires to the electric motor driving the pump upon the road motor fire engine are then connected up in order that the whole of the energy of the said dynamo may be conveyed to the said pump electric motor.

By the described means the internal combustion engine and dynamo coupled directly thereto may serve either to propel the motor fire engine on the road, or to drive the electric motor and pump, or to drive the electric motor or motors for driving the combined vehicle and apparatus upon the rails.

And in order that my invention may be completely understood reference should be made to the accompanying sheet of drawings which illustrates the preferred mode of carrying it into effect.

The figure is an elevation of the rail coach or truck with the petrol electric fire engine in position thereon and with connections made for propelling the rail coach therefrom.

It will be understood that although the hereafter described petrol electric road fire engine is that which we prefer to use in this combination any other suitable electric transmission motor fire engine might be employed.

The internal combustion engine A is directly coupled to the dynamo or generator B which supplies electrical energy to the electric motor C of sufficient size to drive the vehicle. The electric motor drives by means of the cardan or universally jointed shaft D the rear wheels of the petrol electric vehicle through a live axle. One of the rear wheels E is shown in this elevation. The drive is preferably conveyed to the live axle by a worm and worm wheel and differential gear enclosed in the box F.

The current flows by a cable G from the dynamo B to a control or regulating switch H arranged on the dashboard from which it is conveyed by the cable $G^1$ to the electric motor C.

The frame I of the vehicle is extended at $I^1$, upon which extension is secured the pumping unit J comprising the electric motor K and the centrifugal pump L, which has the inlet L¹ and the outlet or delivery L² for connecting the hose pipe (not shown) projecting rearwardly. The inlet is shown capped for travelling. The electric motor and pump are direct coupled on a vertical shaft. The electric motor K is connected by the cable K¹ to the dynamo B through the control switch K².

When the vehicle is stationary and it is desired to operate the pump, the current circuit by the cables G and G¹ to the motor C from the dynamo B is broken by means of the switch H. Then by means of the switch K² on the switchboard K³ the circuit is closed from the dynamo B to the motor K and the current flows through the cable K¹ from the dynamo B to energize the electric motor K, to drive the pump L. A speed regulator M, and ammeter N are mounted on the switchboard K³. Only one of the two switches H and K² is closed at a time, the other being left open.

The railway coach or truck shown is at one end provided with a hinged door P which is adapted to fall down and to enable the petrol electric fire engine as described to be run upon the coach from a platform or from the ground by means of an ordinary ramp, not shown. When the fire engine is secured in position on the motor coach the plug connector Q of the cable R is inserted. The cable R is connected to the control switch R¹. The connection of the dynamo B with the electric motors C and K is then broken by means of the switches H and K² respectively so that these are isolated. The switch R¹ is then operated in order to complete the circuit and the current then flows from the dynamo B by the cable R² to the electric motors S, S¹, to energize both of them equally. The electric motors S S¹, are each so arranged adjacent the two railway truck axles T, T, and parallel therewith that the electric motors S, S¹, may drive the two rail flanged wheels U, U, by means of the spur gear wheels V, V, which are keyed to the axles T, T, and spur pinion wheels W, W, which are mounted upon the shafts of the electric motors S, S¹, the speed control being effected by means of the switch R¹. The brakes and the other apparatus of the railway coach are of the usual kind. The switch R¹ is mounted in a convenient position for the driver of the rail motor coach adjacent the usual brake lever.

When the rail coach thus driven has reached the scene of the fire, the electric pumping unit J may be operated if desired with the petrol electric fire engine mounted in position as shown on the railway coach by breaking the connection by means of the switch R¹ of the dynamo B to the motors S, S¹, and connecting the dynamo as before described to the electric motor K. Or the petrol electric fire engine may be run off the railway coach to the scene of the fire by energizing the electric motor C as before described in the usual way.

The flexible hose pipe to the fire engine is carried within the body O.

It will be understood that the whole of the electric energy provided by the dynamo B coupled direct to the internal combustion engine A is conveyed to one only of the driving uses for which this electrical energy may be employed, viz. firstly, it may energize the electric motor C driving the petrol electric vehicle, or secondly, the electric motor K of the pumping unit J, or thirdly, the electric motors S, S¹, serving to drive the railway coach shown, that is to say, that when the current of the dynamo B is employed for one of the said purposes, it is completely switched off from the other two.

What I do claim as my invention and desire to secure by Letters Patent is:—

1. A rail coach or truck adapted to carry a road electric motor fire engine and to receive electric energy therefrom for propulsion.

2. The combination with a road motor vehicle, having a prime mover and a dynamo as a power unit, of a rail carriage propelled by said dynamo.

3. The combination with a road motor vehicle having a power unit in the form of a prime mover and a dynamo, and a pump adapted to be operated from said dynamo, of a rail carriage adapted to be propelled from the dynamo.

4. The combination with a road motor vehicle having a power unit in the form of a prime mover and a dynamo, and a pump adapted to be operated from said dynamo, of a rail carriage having an electric motor associated with the axle thereof, said motor adapted to be energized from the dynamo.

5. The combination with a road motor vecle having a power unit in the form of a prime mover and a dynamo, and a pump adapted to be operated from said dynamo, of a rail carriage having an electric motor associated with the axle thereof, said motor adapted to be energized from the dynamo, and switching and connecting means whereby the electric energy supplied by the dynamo may be directed for propelling the road vehicle, for operating the pump, or for propelling the rail carriage.

HAROLD HERBERT CARTER.